United States Patent
Chang et al.

(10) Patent No.: US 8,946,132 B2
(45) Date of Patent: Feb. 3, 2015

(54) CONTROLLED RELEASE OF SURFACTANTS FOR ENHANCED OIL RECOVERY

(75) Inventors: Yun Chea Chang, Dhahran (SA); Mazen Kanj, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 93 days.

(21) Appl. No.: 13/184,974

(22) Filed: Jul. 18, 2011

(65) Prior Publication Data
US 2013/0023450 A1    Jan. 24, 2013

(51) Int. Cl.
*C09K 8/588* (2006.01)
*C09K 8/584* (2006.01)

(52) U.S. Cl.
CPC ............... *C09K 8/584* (2013.01); *C09K 8/588* (2013.01); *C09K 2208/10* (2013.01)
USPC .......................................... 507/225; 507/259

(58) Field of Classification Search
CPC ................................ C09K 8/588; C09K 8/584
See application file for complete search history.

(56) References Cited

U.S. PATENT DOCUMENTS

| | | | |
|---|---|---|---|
| 3,580,337 A | 5/1971 | Gogarty et al. | |
| 3,638,728 A | 2/1972 | Hill | |
| 3,730,273 A | 5/1973 | Wilson | |
| 3,939,911 A | 2/1976 | Maddox, Jr. et al. | |
| 4,319,636 A * | 3/1982 | Kudchadker et al. | 166/270.1 |
| 4,394,213 A | 7/1983 | Ferm | |
| 4,504,399 A | 3/1985 | Stapp | |
| 4,609,474 A | 9/1986 | Reisberg et al. | |
| 4,702,319 A | 10/1987 | Bock et al. | |
| 4,733,728 A | 3/1988 | Morita et al. | |
| 4,769,162 A | 9/1988 | Remus | |
| 5,662,168 A | 9/1997 | Smith | |
| 6,495,500 B1 | 12/2002 | Connors et al. | |
| 7,271,133 B2 | 9/2007 | Weaver et al. | |
| 2005/0065040 A1 | 3/2005 | Weaver et al. | |
| 2006/0180308 A1* | 8/2006 | Welton et al. | 166/282 |
| 2008/0257551 A1* | 10/2008 | Morris | 166/270 |
| 2010/0048432 A1 | 2/2010 | Costello et al. | |
| 2010/0282467 A1 | 11/2010 | Hutchison et al. | |

FOREIGN PATENT DOCUMENTS

WO    WO2009058889 A1    5/2009

OTHER PUBLICATIONS

Johnson, Stephen, et al., Effects of Divalent Cations, Seawater, and Formation Brine on Positively Charged Polyethylenimine/Dextran Sulfate/Chromium (III) Polyelectrolyte Complexes and Partially Hydrolyzed Polyacrylamide/Chromium (III) Gelation, Journal of Applied Polymer Science, 2010, pp. 1008-1014, vol. 115, Wiley Periodicals, Inc., U.S.
Shupe et al., "Thermal Stability and Degradation Mechanism of Alkylbenzene Sulfonates in Alkaline Media", 145 (1) J. Colloid & Interface Sci. (1991), pp. 235-254.
International Search Report & Written Opinion (PCT/US2012/046034), dated Oct. 23, 2012.

* cited by examiner

*Primary Examiner* — Randy Gulakowski
*Assistant Examiner* — Jeffrey Washville
(74) *Attorney, Agent, or Firm* — Bracewell & Giuliani LLP; Constance G. Rhebergen

(57) ABSTRACT

A controlled release composition comprising an aqueous sulfonate solution; an anionic surfactant; and a salt selected from aluminum nitrate nanohydrate, calcium chloride dehydrate, magnesium chloride hexahydrate, cobalt chloride hexahydrate, and other metal salts. Methods of delivering a controlled release of surfactants composition, the method comprising the steps of: delivering a solution into a reservoir, the solution comprising an aqueous sulfonate solution; an anionic surfactant; and a salt selected from aluminum nitrate nanohydrate, calcium chloride dehydrate, magnesium chloride hexahydrate, cobalt chloride hexahydrate, and other metal salts; and delivering water to the reservoir.

20 Claims, No Drawings

CONTROLLED RELEASE OF SURFACTANTS FOR ENHANCED OIL RECOVERY

BACKGROUND OF THE INVENTION

1. Field of the Invention

The invention is new compositions, delivery systems, and methods suitable for the enhanced oil recovery process.

2. Description of the Related Art

Surfactants are used in the enhanced oil recovery process. The presence of surfactant at water and oil interface facilitates oil recovery. It would be ideal to have a sustained and constant concentration at the interface.

Surfactants and other chemicals are often mixed with water and driven into the reservoir in the enhanced oil recovery (EOR) process. Surfactant molecules, especially anionic surfactants, adsorb to the rock before they interact with oil. Adsorption of the surfactant results in the loss of effective amount of surfactant for mobilizing the oil. The adsorption problem worsens when anionic surfactants encounter carbonate rocks that are Lewis acid in nature.

In addition to adsorption, some surfactants precipitate with cations from the rock and from the saline water. In either case, some surfactants are lost before they have a chance to solubilize oil. The exact amount of surfactant adsorption depends on the type of rock, pore surface area, water salinity and the type of surfactants. In general, roughly one milligram of surfactant may adsorb to one gram of rock.

Conventional methods feed surfactant solution into the reservoir directly. The active surfactant gets consumed readily at the oil-water interface. The approach fails to maintain a constant concentration over an extended period of time.

Moreover, conventional methods feed surfactant solution into the reservoir directly. Significant amount of surfactant is lost due to adsorption to the rock, before it has a chance to see residual oil.

To overcome these problems, one may increase the loading of surfactants in water, allowing extra surfactants to be absorbed by the rock, and delivering the remaining surfactants to the oil/water interface. However, additional surfactant cost impacts negatively on the viability of such a process. Alternatively, other researchers tried to use sacrificial chemicals to passivate the rock surface such that surfactant adsorption is mitigated.

SUMMARY OF THE INVENTION

One embodiment of the invention is a composition for the controlled release of surfactants in oil recovery operation, the composition being made of an aqueous sulfonate solution; an anionic surfactant; and a salt selected from aluminium nitrate nanohydrate, calcium chloride dehydrate, magnesium chloride hexahydrate, cobalt chloride hexahydrate, and other metal salts, wherein the mean diameter of the salt particles is between 20 nm and 100 nm and salt solubility of the composition is less than 100 ppm at room temperature. In another embodiment, the composition additionally contains hydrolyzed polyacrylamide.

Another embodiment of the invention is a hydrocarbon recovery composition comprising a composition which comprises an aqueous sulfonate solution; an anionic surfactant; and a salt selected from aluminium nitrate nanohydrate, calcium chloride dehydrate, magnesium chloride hexahydrate, cobalt chloride hexahydrate, and other metal salts, wherein the mean diameter of the salt particles is between 20 nm and 100 nm and salt solubility of the composition is less than 100 ppm at room temperature. In another embodiment, the composition additionally contains hydrolyzed polyacrylamide.

Another embodiment of the invention is a delivery system for controlling the release of surfactants in hydrocarbon recovery operation, the delivery system comprising an aqueous sulfonate solution; an anionic surfactant; and a salt selected from aluminium nitrate nanohydrate, calcium chloride dehydrate, magnesium chloride hexahydrate, cobalt chloride hexahydrate, and other metal salts, wherein the mean diameter of the salt particles is between 20 nm and 100 nm and salt solubility of the delivery system is less than 100 ppm at room temperature; in an amount operable such that the surfactant reduces surface tension of the hydrocarbon so that oil recovery is increased. In another embodiment, the delivery system further contains hydrolyzed polyacrylamide.

Another embodiment of the invention is a method of delivering a controlled release of surfactants composition, the method including the following steps, such as: (1) delivering a solution into a reservoir, the solution that contains an aqueous sulfonate solution; an anionic surfactant; and a salt selected from aluminium nitrate nanohydrate, calcium chloride dehydrate, magnesium chloride hexahydrate, cobalt chloride hexahydrate, and other metal salts; wherein the mean diameter of the salt particles is between 20 nm and 100 nm and salt solubility of the delivery solution is less than 100 ppm at room temperature; and (2) delivering water to the reservoir.

Another embodiment of the invention is a method of treating a hydrocarbon containing formation by (a) providing a hydrocarbon recovery composition to at least a portion of the hydrocarbon containing formation, wherein the hydrocarbon recovery composition comprises (1) an aqueous sulfonate solution; (2) an anionic surfactant; and (3) a salt selected from aluminium nitrate nanohydrate, calcium chloride dehydrate, magnesium chloride hexahydrate, cobalt chloride hexahydrate, and other metal salts; wherein the mean diameter of the salt particles is between 20 nm and 100 nm and salt solubility of the hydrocarbon recovery composition is less than 100 ppm at room temperature; and (b) allowing the hydrocarbon recovery composition to interact with hydrocarbons in the hydrocarbon containing formation.

DETAILED DESCRIPTION OF THE PREFERRED EMBODIMENTS

The compositions and delivery systems disclosed herein provide a way to slow release surfactant molecules, maintain the concentration at constant levels, and sustain the release over a long period of time. The rock in the reservoir is porous with wide pore size distribution. The pore can be as small as 1 micron and as big as 20 micron. Larger size particles may be trapped by the pores. We envision surfactant salt particles to be small such that they can traverse through the pores. The salt particles should also be big enough that they contain sufficient amount of surfactant for sustained release. We figure that 50-200 nm would be an ideal size.

When the surfactant salt solubility is 100 ppm and 1.0 weight percent of which is added in 1 liter of solution, then the surfactant concentration that is released by the surfactant salt is held constant at 100 ppm. The solution in which the surfactant salt is dispersed in can range from de-ionized water to saline water, with salinity as high as 25 weight percent. If the soluble surfactant is consumed upon contacting oil within one day, then another 100 ppm of surfactant can be replenished by the surfactant salt. The replenishing process is driven by the thermodynamic equilibrium between the solid salt and soluble surfactant. In other words, 100 ppm of free surfactant concentration will be maintained in the solution automatically in the presence of surfactant salt particles. The amount of surfactant salt would last a total of 10 days, regardless of the size of particles or capsules.

In one embodiment, a slug of surfactant mixed in polymer solution is introduced into the reservoir. The surfactant quickly deposits and, depending on the amount used, may be saturated on the oil-water interface. The oil, thus solubilized by the surfactant, can be recovered. Unfortunately, residual oil that lies behind the initial oil-water interface has less a chance of interacting with the surfactant and may remain immobilized.

Sulfonate surfactant may form salts with cat ions. The salt formation is often considered problematic during enhanced oil recover (EOR) since it results in the loss of surfactants. However, the salt can be engineered in such ways that it benefits the EOR process.

There are a number of hurdles one needs to overcome. For example, the surfactant salts or capsules have to be as small as 200 nm or less such that they can travel through the pore in the reservoir. Particle size can be manipulated by controlling the nucleation rate in the precipitation of surfactant salts. Another way to manipulate the particle size is to use the mechanical milling device. In addition, these nano-particles have to be dispersible in the reservoir environment; i.e. up to 100° C. and 25 wt % salinity.

In the pharmaceutical and other industries active ingredients are often delivered in a controlled release fashion. The concentration of active ingredients is maintained at the targeted area. One dosage of active ingredients can sustain the efficacy in a longer period of time. We intend to apply similar techniques to the delivery of surfactants. Ideally, surfactants will be delivered and released at oil and water interface. The delivered surfactant capsules or particles are akin to micro reservoirs that feed surfactant molecules to the oil/water interface at a constant concentration and a constant rate. As a result, residual oil may be solubilized continuously.

We convert anionic surfactants, such as sulfonates, into salts. The sulfonated surfactant has a negative charge which reacts with positively charge cat ions. Depending on the nature of sulfonates and cat ions, some resulting salts are partially or sparingly water soluble. The salts have limited solubility in water and thereby the surfactant salts serve as reservoirs for surfactant molecules.

Anionic surfactant salts precipitated by different cat ions have different solubility, which affects final particle size and amount of free surfactant in solution. In other words, free surfactant concentration can be regulated by the choice of surfactant salts. This invention demonstrates that surfactant salt particles can be made smaller than 200 nm, smaller than 100 nm, and even smaller than 50 nm.

Since surfactant adsorption depends on the concentration of free surfactants, the surfactant salt particles limit the amount of free surfactant concentration and thereby mitigate adsorption.

The invention method supplies a constant flux of surfactant molecules from nano particles of surfactant salt. Because of this sustained supply of fresh surfactant molecules, more residual oil may be recovered. The invention provides colloidal surfactant salts that maintain a constant free surfactant concentration in the solution. Because of this constant and sustained supply of fresh surfactant molecules more residual oil may be recovered.

A slug of solution containing nano particles of surfactant salts, polymer and water is injected into the reservoir. The slug is then followed by a water flood. The rate of floods is adjusted such that optimum amount of oil is recovered.

Method of Preparation

In one embodiment of the invention, between about 0.1 to about 2.0 weight percent of polymer is mixed with about 0.05 to about 5 weight percent of a salt at a temperature between about 0° C. and about 120° C. Examples of polymer, without limitation, are partially hydrolyzed polyacrylamide, xanthan gum and polyvinylpyrrolidone. Examples of salts, without limitation, are aluminum nitrate nanohydrate, calcium chloride dehydrate, magnesium chloride hexahydrate, cobalt chloride hexahydrate, zinc chloride, barium chloride dihydrate, copper nitrate, strontium chloride hexahydrate, and other metal salts. To the polymer/salt mixture between about 0.05 to about 5 weight percent of anionic surfactant is then added with vigorous stirring at temperatures between about 0° C. and about 90° C. Examples of anionic surfactants, without limitation, are alkyl sulfonate alkyl benzene sulfonate, alkyl aryl ether phosphate, alkyl ether phosphate, alky ether sulfate, and alkyl sulfate. To determine whether the resulting precipitates particle size are under 200 nm, the particle size is measured by Zetasizer, such as for example and without limitation, one made by Malvern Instrument, and number averaged particle size is determined.

In another embodiment of the invention, between about 0.05 and about 5 weight percent a metal salt at temperatures between about 0° C. and about 90° C. is added to between about 0.05 to about 5 weight percent of alkyl sulfonate with vigorous stirring. The resulting salt dispersion is centrifuged and filtered. The supernatant sulfonate concentration in the supernatant is measured by the Total Carbon Analyzer.

In one embodiment of this invention to the oil recovery operation, an aqueous dispersion consisting 0.05 to 5 weight percent of polymer, and 0.05 to 5 weight percent of anionic surfactant salt particles with mean particle size less than 200 nm, is injected into oil containing reservoir. The injected dispersion is then kept in the reservoir for 1 hour to 1,000 hours. After the shut in period, the dispersion slug is followed by water flooding.

EXAMPLES

The foregoing may be better understood by reference to the following examples, which are intended for illustrative purposes and are not intended to limit the scope of the invention.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description to the invention. Changes may be made in the elements described herein without departing from the spirit and scope o the invention as described in the following claims. In addition, it is to be understood that features described herein independently may, in certain embodiments, be combined.

Example 1

This example demonstrates that small particle size aluminum sulfonate salt can be prepared. Two ml of 0.3% partially hydrolyzed polyacrylamide was mixed with two ml of 1% aluminum nitrate nonahydrate at 0° C. Nineteen ml of 0.1 wt % (1000 ppm) alkyl sulfonate (trade name MLA-0371, obtained from Chemtura) was then added with vigorous stirring. The resulting precipitates particle size was measured by Zetasizer (Malvern Instrument) and number averaged particle size was determined to be 109 nm.

Example 2

This example demonstrates that small particle size calcium sulfonate salt can be prepared. This example is similar to Example 1, except that 1% calcium chloride dehydrate was used instead of aluminum nitrate nonahydrate. The resulting particle size was 73 nm.

Example 3

This example demonstrates that small particle size magnesium sulfonate salt can be prepared. This example is similar to Example 1, except that 1% magnesium chloride hexahydrate was used instead of aluminum nitrate nonahydrate. The resulting particle size was 62 nm.

Example 4

This example demonstrates that small particle size cobalt sulfonate salt can be prepared. This example is similar to Example 1, except that 1% cobalt chloride hexahydrate was used instead of aluminum nitrate nonahydrate. The resulting particle size was 87 nm.

Example 5

This example demonstrates that the free sulfonate concentration in the supernatant can be modulated by the presence of sulfonate salt. This example is similar to Example 1, except that no partially hydrolyzed polyacrylamide solution was added. The resulting salt dispersion was centrifuged and filtered. The supernatant sulfonate concentration in the supernatant was measured by the Total Carbon Analyzer. It was found that the supernatant contained 63 parts per million of sulfonate. In other words, initial surfactant concentration of 1,000 ppm was reduced to a constant free sulfonate concentration in the supernatant of 63 ppm.

Example 6

This example demonstrates that the free sulfonate concentration in the supernatant can be modulated by the presence of sulfonate salt. This example is similar to Example 5, except that calcium chloride dihydrate, instead of aluminum nitrate nonahydrate, was used. The resulting salt dispersion was centrifuged and filtered. The supernatant sulfonate concentration in the supernatant was measured by the Total Carbon Analyzer. It was found that the supernatant contained 83 parts per million of sulfonate. In other words, initial surfactant concentration of 1,000 ppm was reduced to a constant free sulfonate concentration in the supernatant of 83 ppm.

Example 7

This example demonstrates that the free sulfonate concentration in the supernatant can be modulated by the presence of sulfonate salt. This example is similar to Example 5, except that magnesium chloride hexahydrate, instead of aluminum nitrate nonahydrate, was used. The resulting salt dispersion was centrifuged and filtered. The supernatant sulfonate concentration in the supernatant was measured by the Total Carbon Analyzer. It was found that the supernatant contained 300 parts per million of sulfonate. In other words, initial surfactant concentration of 1,000 ppm was reduced to a constant free sulfonate concentration in the supernatant of 300 ppm.

Example 8

This example demonstrates that the free sulfonate concentration in the supernatant can be modulated by the presence of sulfonate salt. This example is similar to Example 5, except that cobalt chloride hexahydrate, instead of aluminum nitrate nonahydrate, was used. The resulting salt dispersion was centrifuged and filtered. The supernatant sulfonate concentration in the supernatant was measured by the Total Carbon Analyzer. It was found that the supernatant contained 106 parts per million of sulfonate. In other words, initial surfactant concentration of 1,000 ppm was reduced to a constant free sulfonate concentration in the supernatant of 106 ppm.

What is claimed is:

1. A composition useful for controlling the release of an anionic sulfonate surfactant during a hydrocarbon recovery operation, the composition comprising an aqueous solution of a sulfonate surfactant, where the sulfonate surfactant is an alkyl benzene sulfonate, with dispersed particles of a salt of the sulfonate surfactant,
   where the sulfonate surfactant salt particles are operable to control the release of the sulfonate surfactant into the sulfonate surfactant aqueous solution and have a mean particle size of less than 200 nanometers (nm) in the dispersion, and
   where the sulfonate surfactant salt has a solubility in water of less than about 300 parts-per-million (ppm) at room temperature.

2. The composition of claim 1 where the sulfonate surfactant salt particles further comprise a polymer selected from the group consisting of partially hydrolyzed polyacrylamide, xanthan gum, polyvinylpyrrolidone and combinations thereof.

3. The composition of claim 1 where the particles of sulfonate surfactant salt have a mean particle size in a range of from about 50 nm to about 120 nm.

4. The composition of claim 1 where the sulfonate surfactant salt has a solubility in water in a range of from about 50 ppm to about 110 ppm at room temperature.

5. A composition useful for controlling the release of an anionic sulfonate surfactant during a hydrocarbon recovery operation, the composition made by combining a sulfonate surfactant, where the sulfonate surfactant is an alkyl benzene sulfonate, in a range of from about 0.05 weight percent to about 5 weight percent of the composition, a metal salt selected from the group consisting of aluminum nitrate nanohydrate, calcium chloride dehydrate, magnesium chloride hexahydrate, cobalt chloride hexahydrate and combinations thereof in a range of from about 0.05 weight percent to about 5 weight percent of the composition, and water in a range of from about 88 weight percent to about 99 weight percent of the composition such that an aqueous solution of a sulfonate surfactant with dispersed particles of a salt of the sulfonate surfactant forms,
   where the sulfonate surfactant salt particles are operable to control the release of the sulfonate surfactant into the sulfonate surfactant aqueous solution and have a mean particle size of less than 200 nanometers (nm) in the dispersion, and where the sulfonate surfactant salt has a solubility in water of less than about 300 parts-per-million (ppm) at room temperature.

6. The composition of claim 5 where the composition is further made by combining a polymer selected from the group consisting of partially hydrolyzed polyacrylamide, xanthan gum, polyvinylpyrrolidone and combinations thereof in a range of from about 0.1 weight percent to about 2 weight percent of the composition.

7. The composition of claim 5 where the composition is made by first combining the polymer and the metal salt at a temperature in a range of from about 0° C. to about 120° C. to form a polymer/salt mixture and then combining the polymer/salt mixture with the remaining components at a temperature during combination in a range of from about 0° C. to about 90° C.

8. The composition of claim 5 where the sulfonate surfactant salt has a mean particle size in a range of from about 50 nm to about 120 nm.

9. The composition of claim 5 where the sulfonate surfactant salt has a solubility in water in a range of from about 50 ppm to about 110 ppm at room temperature.

10. A method for treating a hydrocarbon containing formation, the method comprising the steps of:
injecting a composition useful for controlling the release of an anionic sulfonate surfactant during a hydrocarbon recovery operation into the hydrocarbon containing formation;
maintaining the injected composition in the hydrocarbon containing formation for a time in a range of from about an hour to about 1,000 hours; and
injecting water into the hydrocarbon containing formation;
where the injected composition comprises an aqueous solution of a sulfonate-surfactant, where the sulfonate surfactant is an alkyl benzene sulfonate, with dispersed particles of a salt of the sulfonate surfactant,
where the sulfonate surfactant salt particles are operable to control the release of the sulfonate surfactant into the sulfonate surfactant aqueous solution and have a mean particle size of less than 200 nanometers (nm) in the dispersion, and
where the sulfonate surfactant salt has a solubility in water of less than about 300 parts-per-million (ppm) at room temperature.

11. The method of claim 10 where the sulfonate surfactant salt particles further comprise a polymer selected from the group consisting of partially hydrolyzed polyacrylamide, xanthan gum, polyvinylpyrrolidone and combinations thereof.

12. The method of claim 10 where the sulfonate surfactant salt has a mean particle size in a range of from about 50 nm to about 120 nm.

13. The method of claim 10 where the sulfonate surfactant salt has a solubility in water in a range of from about 50 ppm to about 110 ppm at room temperature.

14. The method of claim 10 where the injecting of the composition useful for controlling the release of an anionic sulfonate surfactant during a hydrocarbon recovery operation into the hydrocarbon containing formation causes the particles of the salt of the sulfonate surfactant to precipitate in the hydrocarbon containing formation.

15. The composition of claim 1 where the alkyl benzene sulfonate is a dodecyl benzene sulfonate.

16. The composition of claim 5 where the alkyl benzene sulfonate is a dodecyl benzene sulfonate.

17. The method of claim 10 where the alkyl benzene sulfonate is a dodecyl benzene sulfonate.

18. A composition useful for controlling the release of an anionic sulfonate surfactant during a hydrocarbon recovery operation, the composition comprising an aqueous solution of a sulfonate surfactant, where the sulfonate surfactant consists essentially of a combination of an alkyl sulfonate and an alkyl benzene sulfonate, with dispersed particles of a salt of the sulfonate surfactant,
where the sulfonate surfactant salt particles are operable to control the release of the sulfonate surfactant into the sulfonate surfactant aqueous solution and have a mean particle size of less than 200 nanometers (nm) in the dispersion, and
where the sulfonate surfactant salt has a solubility in water of less than about 300 parts-per-million (ppm) at room temperature.

19. A composition useful for controlling the release of an anionic sulfonate surfactant during a hydrocarbon recovery operation, the composition made by combining a sulfonate surfactant, where the sulfonate surfactant consists essentially of a combination of an alkyl sulfonate and an alkyl benzene sulfonate, in a range of from about 0.05 weight percent to about 5 weight percent of the composition, a metal salt selected from the group consisting of aluminum nitrate nonohydrate, calcium chloride dehydrate, magnesium chloride hexahydrate, cobalt chloride hexahydrate and combinations thereof in a range of from about 0.05 weight percent to about 5 weight percent of the composition, and water in a range of from about 88 weight percent to about 99 weight percent of the composition such that an aqueous solution of a sulfonate surfactant with dispersed particles of a salt of the sulfonate surfactant forms,
where the sulfonate surfactant salt particles are operable to control the release of the sulfonate surfactant into the sulfonate surfactant aqueous solution and have a mean particle size of less than 200 nanometers (nm) in the dispersion, and
where the sulfonate surfactant salt has a solubility in water of less than about 300 parts-per-million (ppm) at room temperature.

20. A method for treating a hydrocarbon containing formation, the method comprising the steps of:
injecting a composition useful for controlling the release of an anionic sulfonate surfactant during a hydrocarbon recovery operation into the hydrocarbon containing formation;
maintaining the injected composition in the hydrocarbon containing formation for a time in a range of from about an hour to about 1,000 hours; and
injecting water into the hydrocarbon containing formation;
where the injected composition comprises an aqueous solution of a sulfonate-surfactant, where the sulfonate surfactant consists essentially of a combination of an alkyl sulfonate and an alkyl benzene sulfonate, with dispersed particles of a salt of the sulfonate surfactant,
where the sulfonate surfactant salt particles are operable to control the release of the sulfonate surfactant into the sulfonate surfactant aqueous solution and have a mean particle size of less than 200 nanometers (nm) in the dispersion, and
where the sulfonate surfactant salt has a solubility in water of less than about 300 parts-per-million (ppm) at room temperature.

* * * * *